July 18, 1967    D. B. MATTSON    3,331,489
CONVEYOR BELT LINK CONSTRUCTION
Filed Aug. 1, 1966
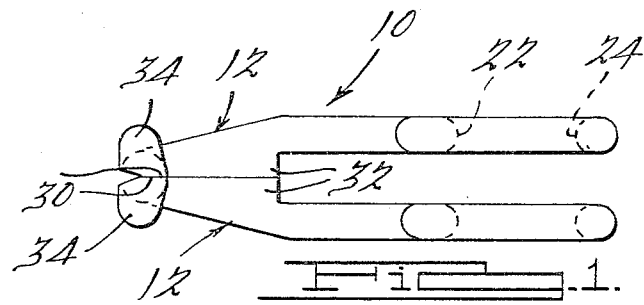
Fig. 1.
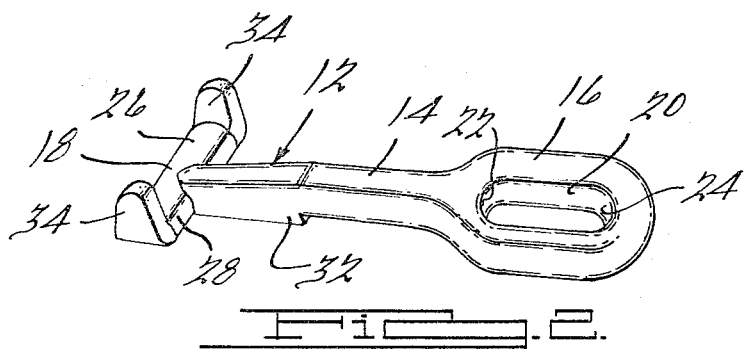
Fig. 2.
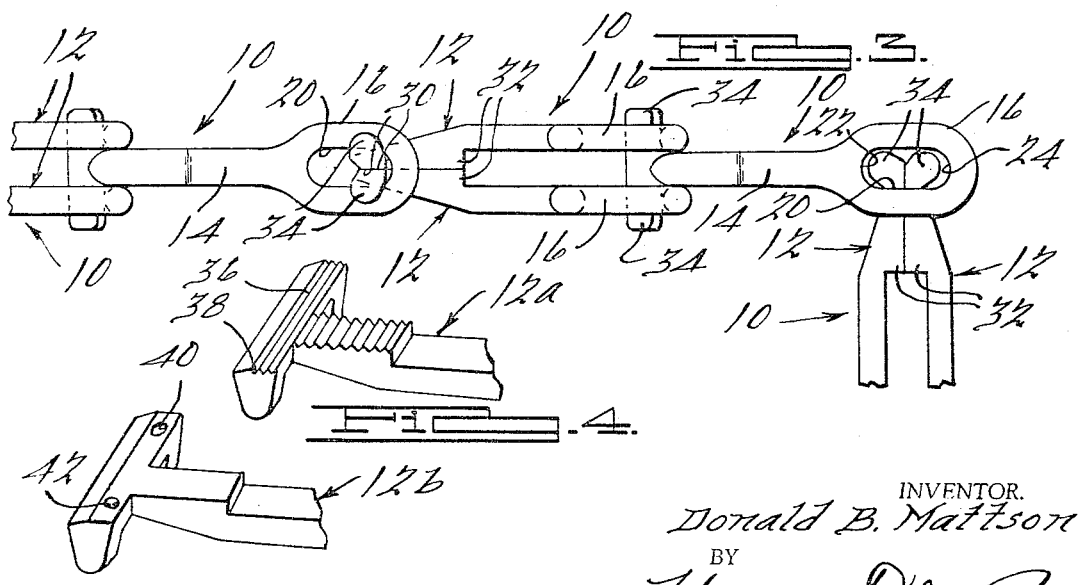
Fig. 3.
Fig. 4.
Fig. 5.
INVENTOR.
Donald B. Mattson
BY
Harness, Dickey & Pierce
ATTORNEYS.

United States Patent Office 3,331,489
Patented July 18, 1967

3,331,489
CONVEYOR BELT LINK CONSTRUCTION
Donald B. Mattson, 39225 Wade Road,
Romulus, Mich. 48174
Filed Aug. 1, 1966, Ser. No. 569,342
10 Claims. (Cl. 198—189)

This invention relates generally to conveyor belts and, more particularly, to conveyor belts of the type comprising a plurality of separate belt links capable of being individually added or removed.

Although a great number of different types of link-type conveyor belts are in common use, to say nothing of the wide variety of such belts that have been heretofore proposed in the art, most, if not all, of the conveyor belt constructions known and used have been objectionable in a number of different ways which have severely restricted their usefulness, as well as the choice of materials and methods of manufacture considered in the fabrication thereof. Among the objections of such heretofore known and used conveyor belts has been the difficulty to separate belt links for one reason or another, such separation usually being accomplished by cutting, sawing, filing, or otherwise severing one of the belt links. A related objection has been the difficulty in inserting or adding new belt links when necessary. Another disadvantage of conveyor belts previously used has resided in the limited use such belts have enjoyed, due in particular to the fact that such belts have not exhibited universal action. Another and even more severe disadvantage of existing conveyor belts has been the manifest limitation that the belts be absolutely maintained under tension, this disadvantage being particularly critical insofar as separable, self-linking belts have been concerned because such belts have had to be maintained under tension in order to prevent inadvertent disassembly thereof. Still other drawbacks of existing conveyor belts has resulted from the belt links being interconnected such that stress applied thereto has been in bending rather than shear, and from excess wear occurring due to point contact between the belt links.

It is accordingly a primary object of the present invention to provide a new and improved conveyor belt link construction.

It is a more particular object of the present invention to provide a new and improved conveyor belt construction which does not have to be maintained in a state of tension in order to prevent separation of the link members thereof.

It is another object of the present invention to provide a conveyor belt construction wherein there is no point contact at the bearing surfaces of the various link members thereof.

It is still another object of the present invention to provide a new and improved conveyor belt link construction wherein the applied stress is always in shear instead of bending moment.

It is yet another object of the present invention to provide a conveyor belt link construction comprising a plurality of easily separable individual half-link members that are alike in every respect and hence completely interchangeable with one another.

It is yet a further object of the present invention to provide a conveyor belt construction which is adapted to be used as a torque transmitting means so as to be applicable for conveying fluids and the like in various tube applications.

It is a further object of the present invention to provide a new and improved conveyor belt link construction of a simple design, which is easy to assemble and economical to commercially manufacture.

Other objects and advantages of the present invention will become apparent from the following detailed description taken in conjunction with the accompanying drawing, wherein:

FIGURE 1 is a top elevational view of a link member in accordance with an exemplary embodiment of the conveyor belt construction of the present invention;

FIGURE 2 is an enlarged perspective view of one of the half-links of the member illustrated in FIGURE 1;

FIGURE 3 is a side elevational view of the conveyor belt construction of the present invention, showing a plurality of assembled conveyor link members and half-links with one of the link members disposed in a position wherein the same may be removed from the conveyor belt;

FIGURE 4 is an elevated perspective view of an alternate embodiment of one of the half-links incorporated in the conveyor belt construction of the present invention, and FIGURE 5 is an elevated perspective view of still another embodiment of one of the half-links incorporated in the conveyor belt construction of the present invention.

Referring now to the drawing, a conveyor belt assembly, in accordance with an exemplary embodiment of the present invention, is shown as comprising a plurality of interconnected conveyor belt link members, one of which is shown in FIGURE 1 and generally designated by the numeral 10. Each of the belt members 10 comprises a pair of half-links 12 which are adapted to be assembled without the use of any extraneous pins, snap rings, or other fastening devices. As best seen in FIGURE 2, each of the half-links 12 comprises a central shank portion 14, an eye portion 16 at one end of the shank portion 14, and a half pin portion 18 at the opposite end of the portion 14. Preferably, the portions 14, 16, 18 are integrally formed, with the result that each of the half-links 12 comprises an individual utilized component part. The eye portion 16 of each of the half-links 12 defines a generally oval-shaped opening 20, the opposite ends of which are substantially convex-shaped as seen at 22 and 24 in FIGURE 1.

Referring to FIGURES 1 and 2, the half-pin portions 18 of each of the half-links 12 comprise laterally outwardly extending sections 26 and 28 which are laterally aligned and disposed on the opposite sides of the central shank portion 14. The sections 26, 28 define a substantially flat or planar surface 30 which is adapted to abut against the surface 30 of the associated half-link 12 upon assembly of the belt members 10. The surfaces 30 are arranged coplanar with abutting shoulders 32 disposed on the inner or confronting sides of the half-links 12. In a preferred construction of the present invention, the shoulders 32 are preferably slightly larger than half the width of the shank portions 14 to enable the adjacent belt members 10 to move longitudinally relative to one another without any interference between the confronting surfaces thereof. The half-pin portions 18 of each of the half-link members 12 is roughly semi-cyclindrical in transverse cross-section such that upon assembly of the half-links 12 in the manner illustrated in FIGURE 1, the half-pin portions 18 provide a substantially cylindrical, laterally extending pin which is of a diameter slightly smaller than the width of the openings 20.

The outer ends of each of the half-pin portions 18 are provided with outwardly extending retaining tab sections 34, each of which is slightly elongated with a substantially semi-circular end, as seen in the side elevational view in FIGURE 1, with the result that when the two half-links 12 of each of the belt members 10 are assembled in the manner illustrated in FIGURES 1 and 3, the adjacent retaining tabs are of a generally oval configuration. As will be apparent, the lengths of the openings 20 are slightly greater than the combined lengths of the tab sections 34 of each pair of half-links 12 to permit assembly of the members 10; however, the combined lengths of the sections 34 are greater than the widths of the openings 20 to prevent disassembly of the members 10 when the same are longitudinally arranged.

Referring now to FIGURE 3, assembly of the conveyor belt construction of the present invention is accomplished by initially orienting the pairs of half-links 12 so that they are arranged in the manner shown in FIGURE 1. One of the link members 10 is then arranged at right angles with respect to another of the members 10 so that the eye portions 16 of the half-links 12 of one member 10 may be placed over the retaining tabs 34 of the other member 10. Thereafter, one of the members 10 is moved or pivoted 90° about the axis defined by the cylindrical pin composed of the half-pin portions 18 until the two belt members 10 are disposed longitudinally of one another. This procedure, of course, is continued until a conveyor belt of the desired length is assembled.

FIGURES 4 and 5 show two alternate embodiments of the half-links 12 incorporated in the conveyor belt of the present invention. More particularly, the half-links 12a and 12b shown in FIGURES 4 and 5, respectively, are provided with means for preventing any relative longitudinal movement between the half-links of each conveyor belt member. The half-link member 12a is provided with a plurality of laterally extending serrations or alternate lands 36 and grooves 38 which are formed on the surface 30 and shoulder 32. The lands 36 and grooves 38 of the half-links 12a of each belt member 10 are preferably of a complementary configuration so that upon assembly of the members 10, the lands of one of the half-links 12a will be nested within the grooves of the adjacent half-links, with the result that any relative longitudinal movement between the half-links 12a will be positively prevented.

The half-link 12b shown in FIGURE 5 is provided with a substantially hemispherical recess 40 and with a substantially hemispherical detent 42 on the surface 30 thereof. The half-link 12b is adapted to be associated with another similar half-link which is provided with a suitable recess adapted to receive detent 42 and with a detent adapted to be received within the recess 40. In other words, the half-link 12b is provided with a projection and a recess adapted to engage a recess and projection on the surface 30 of an associated half-link, with the result that relative longitudinal movement between the two half-links will be effectively precluded in the same manner as the half-link 12a shown in FIGURE 4.

It will be seen from the foregoing that the present invention provides a novel conveyor belt construction which is adapted to overcome a great many disadvantages of similar type conveyor belts heretofore known and used. In particular, the present invention provides a conveyor belt having a plurality of belt links which may be easily separated when desired, which belt links are positively prevented from being separated even when they are not maintained under a state of tension so that inadvertent disassembly thereof is precluded. The half-links 12 are constructed such that they may be forged, whereby to enhance the economies of manufacture, as well as providing a rugged and durable belt construction which may be fabricated of economical and readily available materials. It will be apparent that the design of the belt members 10 of the present invention is such that forces applied thereto are always in shear, as opposed to bending moment, whereby to provide an extremely strong construction. Moreover, it will be noted that the engageable surfaces of adjacent belt member 10 have substantial bearing areas, thus overcoming the disadvantages of point contact exhibited by conveyor belt constructions heretofore known and used. Superior strength is achieved by the provision of double pin diameters in each of the belt members 10.

Although the conveyor belt construction of the present invention is adapted to find particularly useful application in the usual conveyor belt installations, by virtue of its universal action, it will also find use in various tube applications for conveying fluid like substances, granules and the like through tubular conduits. It will be apparent, of course, that the conveyor belt construction of the present invention will not be limited to such uses and that many additional applications may be found.

While it will be apparent that the exemplary embodiment illustrated herein is well calculated to fulfill the objects above stated, it will be appreciated that belt link construction of the present invention is susceptible to modification, variation and change without departing from the proper scope or fair meaning of the subjoined claims.

What is claimed is:
1. A self-linking conveyor belt member comprising,
   a pair of substantially identical half-links,
   each of said half-links including an eye portion, a central shank portion and a half-pin portion,
   said half-pin portions extending outwardly from the opposite sides of said shank portions and being partially cylindrical such that upon assembly of said two half-links, said half-pin portions form a substantially cylindrical pin,
   said eye portions, upon assembly of said two half-links, defining a bore adapted to be traversed by the substantially cylindrical pin of an adjacent belt member, and
   means projecting from said half-pin portions for preventing any substantially lateral movement of the eye portions of an adjacent belt member relative to said substantially cylindrical pin.
2. The invention as set forth in claim 1 wherein said last mentioned means comprises an outwardly extending tab section on each end of said half-pin portion.
3. The invention as set forth in claim 2 wherein the combined length of the tab sections on the adjacent ends of said pin portions is slightly smaller than the length of said bore to permit assembly of adjacent belt members.
4. The invention as set forth in claim 2 wherein the combined length of the tab sections on the adjacent ends of said pin portions is slightly greater than the width of said bore to prevent disassembly of adjacent belt members when the same are longitudinally arranged.
5. The invention as set forth in claim 1 wherein the longitudinal ends of said eye portions are of generally convex shape.
6. The invention as set forth in claim 1 wherein the width of said bore is slightly greater than the diameter of said substantially cylindrical pin.
7. The invention as set forth in claim 1 which includes means for preventing any relative longitudinal movement between said half-links.
8. The invention as set forth in claim 7 wherein said means comprises complementary irregular surfaces on said half-pin portions of said belt member, said surfaces being engageable with one another upon assembly of said member.
9. The invention as set forth in claim 7 wherein said means comprises a plurality of lands or grooves on said half-links.
10. The invention as set forth in claim 7 wherein said means comprises complementary shaped recessed portions and detent portions formed on confronting portions of said half-links.

References Cited
UNITED STATES PATENTS
1,715,094   5/1929   Meekins _____ 198—189 X EVON C. BLUNK, *Primary Examiner.*

EDWARD A. SROKA, *Examiner.*